(12) United States Patent
Jain et al.

(10) Patent No.: US 7,456,618 B2
(45) Date of Patent: Nov. 25, 2008

(54) DIGITAL CONTROLLER FOR A VOLTAGE REGULATOR MODULE

(75) Inventors: Praveen Jain, Kingston (CN); Wennan Guo, Kingston (CN)

(73) Assignee: Chil Semiconductor, Inc., Ontario (CA)

( * ) Notice: Subject to any disclaimer, the term of this patent is extended or adjusted under 35 U.S.C. 154(b) by 331 days.

(21) Appl. No.: 11/261,661

(22) Filed: Oct. 31, 2005

(65) Prior Publication Data
US 2007/0096704 A1  May 3, 2007

(51) Int. Cl.
*G05F 1/59* (2006.01)
(52) U.S. Cl. ..................................... 323/272
(58) Field of Classification Search ................. 323/272, 323/282, 283, 284, 285, 351
See application file for complete search history.

(56) References Cited

U.S. PATENT DOCUMENTS

| | | | |
|---|---|---|---|
| 5,555,165 A | 9/1996 | Vinciarelli | 363/95 |
| 5,731,731 A | 3/1998 | Wilcox et al. | 327/403 |
| 5,946,210 A | 8/1999 | Montminy et al. | 700/97 |
| 6,160,386 A * | 12/2000 | Hemena et al. | 323/272 |
| 6,188,209 B1 | 2/2001 | Poon et al. | 323/255 |
| 6,225,795 B1 | 5/2001 | Stratakos et al. | 323/283 |
| 6,285,175 B1 | 9/2001 | Massie | 323/290 |
| 6,307,356 B1 | 10/2001 | Dwelley | 323/282 |
| 6,351,108 B1 | 2/2002 | Burstein et al. | 323/283 |
| 6,498,467 B1 | 12/2002 | Stratakos | 323/284 |
| 6,545,450 B1 | 4/2003 | Ledenev et al. | 323/272 |
| 6,583,610 B2 * | 6/2003 | Groom et al. | 323/288 |
| 6,593,724 B1 | 7/2003 | Chen | 323/283 |
| 6,674,274 B2 * | 1/2004 | Hobrecht et al. | 323/285 |
| 6,696,823 B2 | 2/2004 | Ledenev et al. | 323/272 |
| 6,696,825 B2 | 2/2004 | Harris et al. | 323/282 |
| 6,696,882 B1 | 2/2004 | Markowski et al. | 327/531 |
| 6,703,814 B2 | 3/2004 | Pohlman et al. | 323/272 |
| 6,791,302 B2 | 9/2004 | Tang et al. | 323/272 |
| 6,803,752 B1 | 10/2004 | Chen | 323/282 |
| 6,809,504 B2 | 10/2004 | Tang et al. | 323/274 |
| 6,819,537 B2 | 11/2004 | Pohlman et al. | 361/64 |
| 6,828,765 B1 | 12/2004 | Schultz et al. | 323/284 |
| 6,897,715 B2 | 5/2005 | Barber, Jr. et al. | 327/541 |
| 6,909,265 B2 | 6/2005 | Tang | 323/274 |
| 6,943,535 B1 | 9/2005 | Schiff | 323/246 |
| 6,965,502 B2 | 11/2005 | Duffy et al. | 361/18 |
| 6,975,494 B2 | 12/2005 | Tang et al. | 361/64 |
| 7,068,023 B2 * | 6/2006 | Okada | 323/285 |
| 7,071,660 B2 * | 7/2006 | Xu et al. | 323/266 |
| 7,109,689 B2 * | 9/2006 | Schneider | 323/272 |
| 7,132,818 B2 * | 11/2006 | Matsuura | 323/222 |

* cited by examiner

*Primary Examiner*—Adolf Berhane
(74) *Attorney, Agent, or Firm*—Chapin IP Law, LLC (57) ABSTRACT

A digital controller for a voltage regulator module (VRM) having single phase or multiphase power converters, and an optional dynamic conversion circuit, is disclosed. The digital controller improves the transient response of the VRM during harsh load current transients, and permits a substantial reduction in output capacitance of the VRM. When used with multiphase interleaved power converters, for a given load current requirement, the digital converter permits the number of interleaved phases of the VRM to be minimized. A VRM with the digital controller demonstrates low cost, high power density, high efficiency, and fast transient response.

22 Claims, 10 Drawing Sheets

DIGITAL CONTROLLER FOR A VOLTAGE REGULATOR MODULE

FIELD OF THE INVENTION

The invention generally relates to a voltage regulator module (VRM), and particularly to control methods and devices for enhancing the transient response of a VRM under dynamic load conditions.

BACKGROUND OF THE INVENTION

Figure 1:
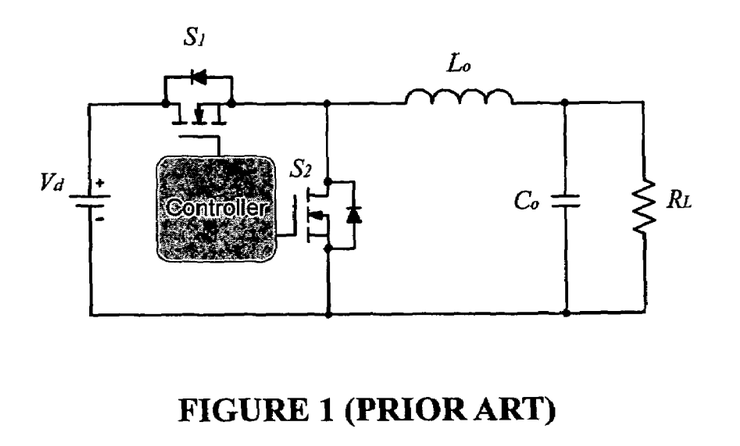
FIG. 1 is a schematic diagram of a prior art single phase synchronous buck converter.

A voltage regulator module (VRM) is used to regulate a DC voltage supplied to a load, such as microprocessor. A VRM includes a power converter, such as a DC-DC converter, and may include other components such as a controller for controlling operation of the power converter. An example of a DC-DC converter is a synchronous buck converter, as shown in FIG. 1, which has minimal components, and therefore is widely used in VRM applications. In microprocessor applications, the input voltage to the VRM is typically $12V_{DC}$. The output voltage may be $5.0 V_{DC}$, $3.3 V_{DC}$, or lower.

As microprocessors become more advanced, required supply voltages become lower. Supply voltages are expected to be as low as $0.5 V_{DC}$ in the near future, which will require currents up to 200 A or more. Currently, the CPU of a typical personal computer operates at 3 GHz, and operating frequencies are expected to reach 10 GHz in the near future. A consequence of the low supply voltage and high clock frequency is the high slew rate (di/dt) of the load current at power up. For example, when a microprocessor wakes from sleep mode to full operating mode, the step of the output current may be as high as 200 A, with a slew rate of 1,000 A/µs or higher. The slew rate may be over 1,000 A/µs in future designs. The voltage supplied to current microprocessors is required to be regulated within 2%, and 1% for future VRMs ("VRM 9.1 DC-DC converter design guidelines", Intel Order Number 298646-001, January 2002). The absolute value of such voltage regulation is currently 30 mV and 10 mV for future designs. Such tight voltage regulation is required to maintain normal operation of CMOS transistors in the microprocessor under all conditions. For instance, under worst case (high slew rate of the output current) conditions, the output voltage should not drop by more than 30 mV to avoid abnormal operation of the CPU. However, the voltage drop of VRMs based on existing designs may be so large that the output voltage regulation limit may easily be exceeded.

Various VRM topologies and control methods have been proposed in an attempt to satisfy the transient response requirements of microprocessors. However, such designs are not well-suited to the harsher dynamic requirements of next generation microprocessors.

Figure 2:
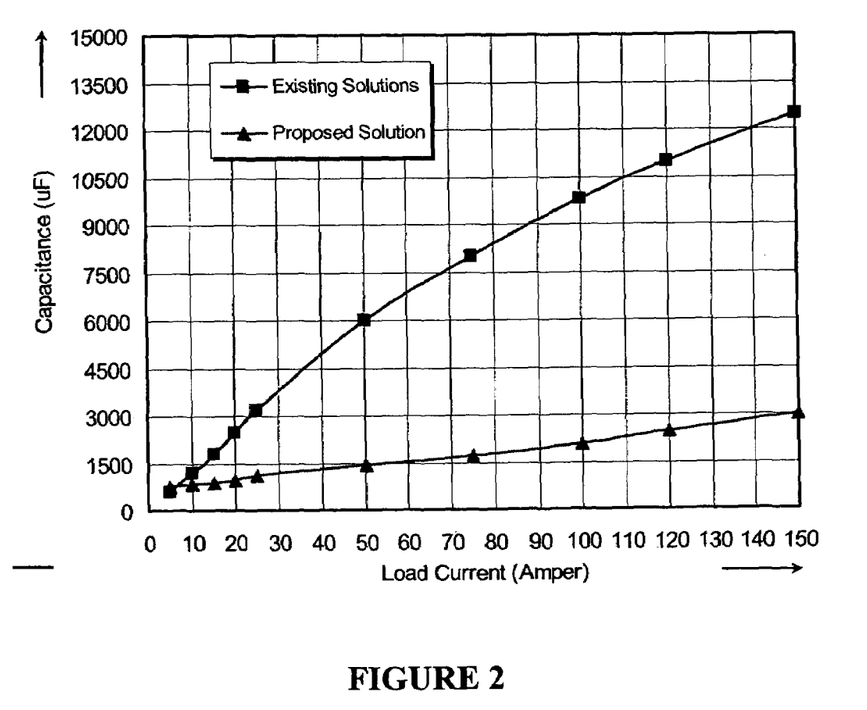
FIG. 2 is a plot of estimated output capacitance versus load current for the invention compared with prior art VRMs.

For example, simply increasing the output capacitance can reduce the output voltage ripple, and also help maintain the output voltage during a sudden load change. However, for a single phase $1.5 V_{DC}/25$ A VRM, for instance, a design that can meet the steady sate and transient voltage regulation specification typically requires at least 5,000 µF output capacitance. Such filter capacitors are bulky and expensive. It is estimated that for a VRM supplying $0.5 V_{DC}$ at 100 A, the required output capacitance would be more than 10,000 µF, and should have considerably lower equivalent series inductance (ESL) and equivalent series resistance (ESR) to be effective during load transients. FIG. 2 (top curve only) shows such a relationship between the output capacitance and load current for typical prior VRMs. Although multiphase topology, which helps to reduce output capacitance, may be used for applications when the load current exceeds 20 A, the value of the capacitance is still exceedingly high at high load current.

Reducing the output inductance of a buck converter can improve its dynamic response. However, the inductance can not be reduced unbounded, otherwise the output voltage ripple will increase above acceptable limits (e.g., above 10 mV for next generation microprocessors). The increased voltage ripple will in turn reduce the room for the output voltage drop during load dynamics. In addition, a larger ripple current through the filter inductor implies a larger RMS current through the power switches, which will reduce the overall efficiency of the VRM under steady state operation. Moreover, even though the inductance can be reduced for a faster dynamic response, it is not enough to provide adequate response speed for future microprocessors if the output capacitance is required to be small to reduce cost and to satisfy size and volume constraints.

Multiphase interleaved VRM topology provides two or more power converters in parallel and shares the same output capacitors among converters. In each of the power converters (or each phase), the filter inductor can be smaller than that of a single phase VRM to achieve a faster dynamic response. The large output voltage ripple in each phase due to the small inductance can be cancelled by the ripple of other phases. The more phases are in parallel, the smaller the ripple will be, but at the expense of increased circuit cost. Multiphase topology can therefore enhance the output current capability of a VRM. However, if the output current can be provided by a single phase VRM or a VRM with fewer phases, then adopting a multiphase topology or adding extra phases in parallel solely for the purpose of reducing the ripple voltage adds considerable complexity, size, and cost. More importantly, it is very difficult for a conventionally-controlled multiphase VRM to achieve the dynamic response required by future microprocessors, without having very large output capacitance.

Current mode control has a faster dynamic response than that of conventional voltage mode control in situations where only a small perturbation such as a small load change occurs. However, its dynamic performance is not superior to that of voltage mode control when a large transient occurs. More importantly, in current mode control, the current is detected by employing a sensing resistor or a current transformer. However, for an output current of 100 A or higher, it would be impractical to use a resistor to accurately and efficiently sense the current. On the other hand, a current transformer is bulky and the sensed current must be averaged, resulting in further increases in the reaction time and drop in the output voltage when a large load step happens.

The voltage droop control method takes advantage of the upper and lower limits of the VRM output voltage to gain more room for dynamic responses. When the load current is low, the reference voltage is set to be higher than the nominal value but still within the specified upper limit. When a load step-up happens, the output voltage will drop but will have more room to drop than if it were starting from the nominal value. When the load current is high, the reference voltage is set to be low; thus when a load step-down happens, the output voltage has more room for the overshoot. However, this small room is far from being enough to handle the harsh dynamic requirements of next generation microprocessors. Moreover, the voltage droop control method also requires current sensing, which again is not very practical, as discussed above.

Operating the power converter at a very high frequency will improve the dynamic response of a VRM having a very small output capacitance. However, design of an efficient power converter operating at a very high frequency is difficult. Further, the efficiency of a power converter decreases eventually to an unacceptable or unsatisfactory level as its operating frequency increases. In general, increasing the switching frequency of a power converter solely for the purpose of improving the dynamic performance is not an optimum solution.

A stepping inductor method for fast transient response of switching converters is disclosed in U.S. Pat. No. 6,188,209, issued Feb. 13, 2001 to Poon et al. Relative to the basic buck converter, this design requires significantly more circuit components, which may be difficult and expensive to implement in a multiphase interleaved VRM, because all of the components need to be repeated for each phase. Moreover, the control circuit for load transients is analog based and the output voltage is compared to fixed hysteresis reference voltages to trigger and terminate the transient operation of the converter independently of the load current conditions. This implies that the transient circuit works the same way for a 25%, 50%, and 100% load step, for instance. Therefore, the voltage response during a load transient is not regulated and may exceed the specified limits of the output voltage during many load conditions.

A transient override circuit is proposed in U.S. Pat. No. 6,696,882, issued Feb. 24, 2004 to Markowski et al. This circuit detects the load voltage level to trigger a transient operation mode of the VRM. In transient operation mode, the power switch of a buck converter is forced to be turned on, and the synchronous power switch of the buck converter is turned off, to override the current through the output inductor. However, the circuit and control method are analog based, and, importantly, are not able to regulate the output voltage during the transient.

Peterchev et al. ("Architecture and IC implementation of a digital VRM controller", *IEEE Transactions on Power Electronics,* 18 (1):356-364, 2003) relates to a digital controller for a dc-dc switch mode converter. However, the reference focuses on digital control only for normal steady state operation. Saggini et al. ("An innovative digital control architecture for low-voltage, high current dc-dc converters with tight voltage regulation", *IEEE Transactions on Power Electronics,* 19 (1):210-218, 2004) addresses digital control for improving the transient response of a VRM. However, this reference teaches a variable frequency control method in combination with voltage droop control, which requires accurate sensing of the load current. U.S. patent Publication No. 2004/015098, published Aug. 5, 2004, relates to a digital controller for a VRM; however, some of the operations carried out by this controller are effected through analog circuitry.

SUMMARY OF THE INVENTION

According to one aspect of the invention there is provided a digital controller for a switching DC-DC converter of a voltage regulator module, comprising: a voltage sensor for sensing an output voltage of the DC-DC converter and generating a corresponding digital signal; means for determining an expected output current of the DC-DC converter from the digital signal; and means for generating at least one gate signal when: (i) the expected output current is greater than an operating current; and/or (ii) the sensed output voltage is less than a threshold output voltage; wherein the at least one gate signal is provided to at least one switch of the DC-DC converter, the at least one gate signal turning on a first switch that increases current output of the DC-DC converter and/or turning off a second switch that limits output current of the DC-DC converter.

In one embodiment, the means for generating at least one gate signal may generate a gate signal for each switch in the DC-DC converter.

The DC-DC converter may be of an isolated or a non-isolated topology, such as boost, buck, or buck-boost. In a preferred embodiment, the DC-DC converter is a buck converter.

In one embodiment, the voltage regulator module may include a dynamic conversion circuit, and the means for generating at least one gate signal generates a gate signal for at least one switch in the dynamic conversion circuit. In another embodiment the means for generating at least one gate signal may generate a gate signal for each switch in the dynamic conversion circuit and for at least one switch in the DC-DC converter.

The at least one gate signal may be a pulse train of higher frequency than a switching frequency of the DC-DC converter. The at least one gate signal may be pulse width modulated.

In a further embodiment, two or more switching DC-DC converter circuits may be included in the voltage regulator module, wherein the means for generating at least one gate signal comprises means for generating a gate signal for at least one switch of each DC-DC converter. The voltage regulator module may include a dynamic conversion circuit, and the means for generating at least one gate signal may comprise means for generating a gate signal for each switch in the dynamic conversion circuit and for at least one switch of each DC-DC converter. The two or more DC-DC converters may be of an isolated or a non-isolated circuit topology. Preferably, at least one DC-DC converter is a buck converter.

According to another aspect of the invention there is provided a method for digitally controlling a voltage regulator module including a switching DC-DC converter, comprising: sensing an output voltage of the DC-DC converter and generating a corresponding digital signal; determining an expected output current of the DC-DC converter from the digital signal; generating at least one gate signal when: (i) the expected output current is greater than an operating current; and/or (ii) the sensed output voltage is less than a threshold output voltage; and providing the at least one gate signal to at least one switch of the DC-DC converter of the voltage regulator module; wherein the at least one gate signal turns on a first switch that increases current output of the DC-DC converter and/or turns off a second switch that limits output current of the DC-DC converter.

In one embodiment, the method may further comprise generating a gate signal for each switch in the DC-DC converter.

In one embodiment, the voltage regulator module may include a dynamic conversion circuit, the method further comprising generating a gate signal for a switch of the dynamic conversion circuit. In another embodiment the method may further comprise generating a gate signal for a switch in the dynamic conversion circuit and for at least one switch of the DC-DC converter.

In accordance with the method, the DC-DC converter may be of an isolated or a non-isolated topology, such as buck, boost, or buck-boost. In a preferred embodiment, the DC-DC converter is a buck converter.

In one embodiment, the method may further comprise generating the gate signal as a pulse train of higher frequency than a switching frequency of the DC-DC converter. The method may further comprise pulse width modulating the gate signal.

In another embodiment, the voltage regulator module may include two or more DC-DC converters, the method further comprising generating at least one gate signal for at least one switch of each DC-DC converter. The method may further comprise generating a gate signal for each switch in each DC-DC converter. The voltage regulator module may include a dynamic conversion circuit, and may further comprise generating a gate signal for a switch in the dynamic conversion circuit. The method may further comprise generating a gate signal for at least one switch in each DC-DC converter and for a switch in the dynamic conversion circuit. Each DC-DC converter may be of an isolated or a non-isolated circuit topology, such as buck, boost, or buck-boost. Preferably, at least one DC-DC converter is a buck converter.

In some embodiments of the method, determining an expected output current of the DC-DC converter from the digital signal may comprise calculating the output current from a linear or a non-linear function. In other embodiments, determining an expected output current of the DC-DC converter from the digital signal may comprise determining a corresponding current value from a look-up table.

According to another aspect of the invention there is provided a voltage regulator module comprising at least one DC-DC power converter circuit and a digital controller as described herein. The voltage regulator module may further comprise a dynamic conversion circuit as described herein.

BRIEF DESCRIPTION OF THE DRAWINGS

The invention will now be described, by way of example, with reference to the accompanying drawings, wherein.

DETAILED DESCRIPTION OF PREFERRED EMBODIMENTS

Digital control has many advantages over analog control in a power converter. One of the most important advantages relates to the flexibility of digital control. Various control schemes that may be difficult to implement in analog control become feasible when digital control is applied. However, no previous digital controllers for VRMs provide satisfactory solutions for transient load conditions, particularly the transients expected to be presented by future microprocessors.

A digital controller as described herein provides a novel solution to the control of a VRM during transients, by employing voltage sensing of the VRM output voltage. By sensing minute changes in the output voltage, and relating the output voltage to the corresponding required output current (e.g., predicting the output current from the sensed output voltage), a digital controller as described herein may respond quickly to sudden demands for current that would otherwise result in a substantial drop in output voltage, compromising performance of the load. As exemplified by the embodiments described herein, the digital controller of the invention has been optimized to work in conjunction with either a dynamic conversion circuit and a power converter, such as a buck converter, or with only a power converter, as use of the digital controller to enhance performance of any power converter may be accomplished with only minor modifications to the embodiments described herein.

By implementing the digital controller and the control method of the invention, increasing the switching frequency of the DC-DC converter is unnecessary, because an increased switching frequency does not further improve the dynamic response of the converter. The switching frequency may be kept below 500 kHz to achieve a higher efficiency and at the same time maintain a very fast dynamic response with greatly reduced output capacitance. The greatly reduced output capacitance enables the use of ceramic capacitors, which are smaller in size and have a much smaller equivalent series resistance (ESR). Consequently, a VRM according to the invention will require less space on a PCB and cost will be reduced. Further, the digital implementation offers great flexibility, including external programming, such that no analog components need to be substituted under different conditions. Factors such as tolerance, temperature, and aging of components have no effect on components such as the compensator due to the digital implementation.

According to one aspect of the invention there is provided a voltage regulator module, comprising a power conversion circuit, an optional dynamic conversion circuit, and a digital controller. The load may be of various devices that require tight output voltage regulation. A microprocessor is an example of such a load due to its large current consumption and the extreme load transients it presents to the VRM. For these reasons, a microprocessor will be considered as the load for the VRM in this disclosure. The power conversion circuit of the VRM is power converter, typically a DC-DC voltage converter such as a synchronous buck converter, but is not limited thereto. Other isolated and non-isolated power converter circuits, such as, for example, boost and buck-boost, may also be used. The power converter may be single phase or multiphase interleaved to regulate the output voltage, depending on how much load current is needed.

The dynamic conversion circuit is a circuit capable of responding rapidly to sudden changes in the load connected to the VRM output. A sudden change in the load, such as an increase in current consumption, results in a decrease in the output voltage from its nominal value. Such a load transient represents a deviation in output current of the power converter from its operating current (i.e., steady-state current). The dynamic conversion circuit responds to such transient decreases in output voltage by transiently increasing the output current of the DC-DC converter, thereby preventing further decreases in output voltage. Thus, the dynamic conversion circuit substantially improves the voltage regulation of the VRM under dynamic load conditions. An example of a suitable dynamic conversion circuit is set forth in our co-pending U.S. patent application Ser. No. 11/261,660, incorporated herein by reference in its entirety. Such a dynamic conversion circuit may be used with any isolated or non-isolated switching DC-DC converter, such as, for example, buck, boost, or buck-boost, single phase or multiphase interleaved, for any load requiring tight voltage regulation under both steady-state and transient conditions.

Figure 3:
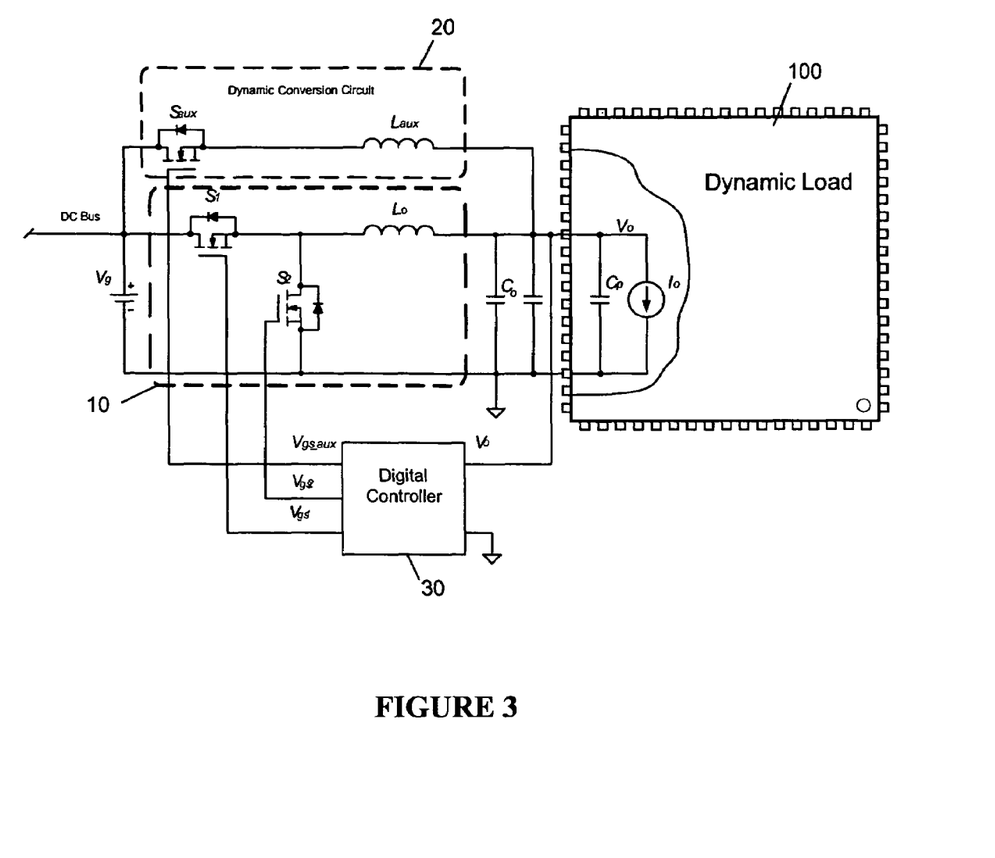
FIG. 3 is a schematic diagram of a single phase VRM circuit including a digital controller according to an embodiment of the invention.

In the embodiment shown in FIG. 3, a VRM comprises a buck converter 10, an optional dynamic conversion circuit 20, and a digital controller 30, and the VRM is connected to a dynamic load 100 (e.g., a microprocessor). The power converter 10 includes switching power devices $S_1$ and $S_2$, and an output filter inductor $L_o$ and capacitor $C_o$. The dynamic conversion circuit 20 includes an auxiliary power switch $S_{aux}$ in series with an auxiliary inductor $L_{aux}$. The dynamic conversion circuit is connected in parallel with the power converter 10. In an alternative embodiment the dynamic conversion circuit 20 may be connected in parallel with only the output inductor $L_o$ of the power converter 10. In either case, the same configuration of digital controller 30 may be used. Further, other configurations of a dynamic conversion circuit may also be used. In various embodiments, the digital controller 30 may be used to control the gate signal of the power switches $S_1$ and/or $S_2$, and/or the auxiliary switch $S_{aux}$ during transients.

Figure 4:
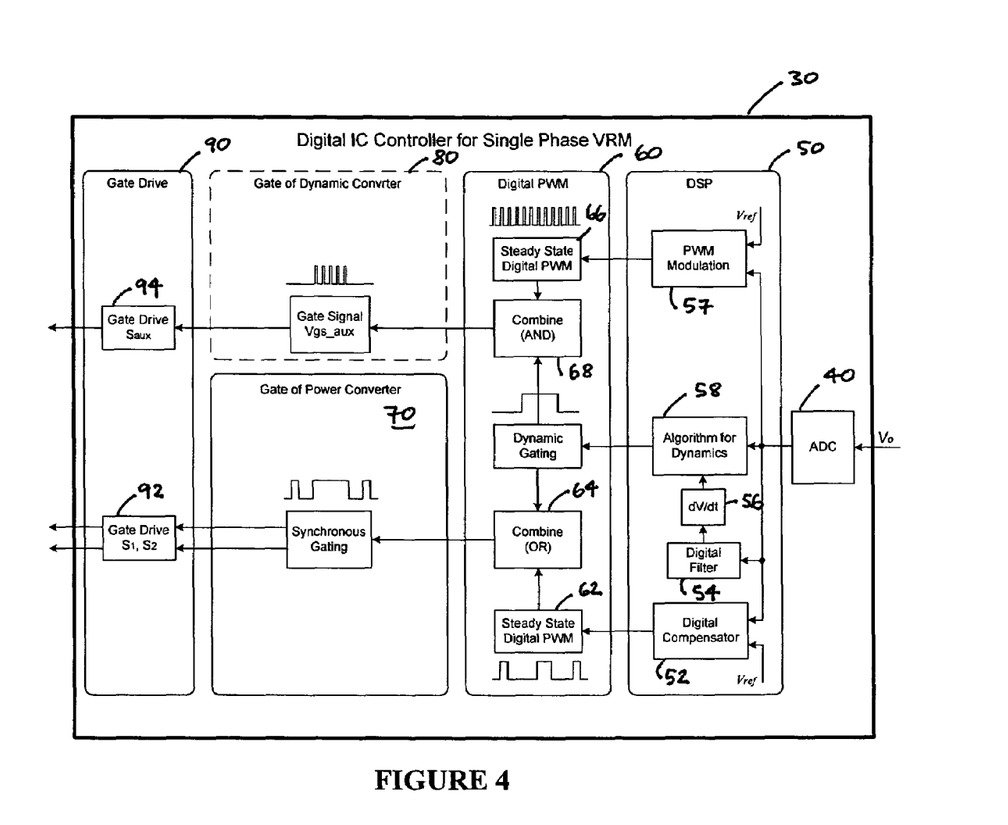
FIG. 4 is a block diagram of a digital controller for a single phase VRM according to the invention.

A block diagram of an embodiment of the digital controller 30 is shown in FIG. 4. This embodiment is for a single phase VRM having a single power converter, for example a buck converter, and an optional dynamic conversion circuit. The digital controller includes six major function blocks:

1) An analog-to-digital converter (ADC) 40 which senses the output voltage at the load and converts the analog voltage signal into digitized bits. The speed and resolution (e.g., number of bits) of the ADC may be specified according to the required performance and the design considerations. For example, we have found that a 12-bit, 125 MSPS (mega samples per second), ADC, part number AD9433-125, available from Analog Devices, is suitable.

2) A digital signal processing (DSP) block 50, which receives the output from the ADC 40 and processes the sampled output voltage based on an algorithm, an example of which is discussed below with respect to FIG. 6;

3) A digital pulse width modulation (PWM) block 60, which receives output from the DSP block 50 and generates a digitized PWM gate signals for the switches of the power converter, and optionally for an auxiliary circuit if used;

4) A gate of power converter block 70, which generates the synchronous gate signals for the two switches of the power converter;

5) An optional gate of dynamic converter block 80, which generates the gate signal for the switch $S_{aux}$ of the optional dynamic conversion circuit; and 6) A gate drive block 90, which drives the gates of the switches of the power converter and optional dynamic conversion circuit with the synchronized PWM signals.

Preferably the digital controller is implemented as an integrated circuit. However, the ADC and the gate drive block may not be necessarily integrated into the digital controller device; that is, either one or both of these blocks may be physically discrete from such an integrated digital controller device.

Figure 5:
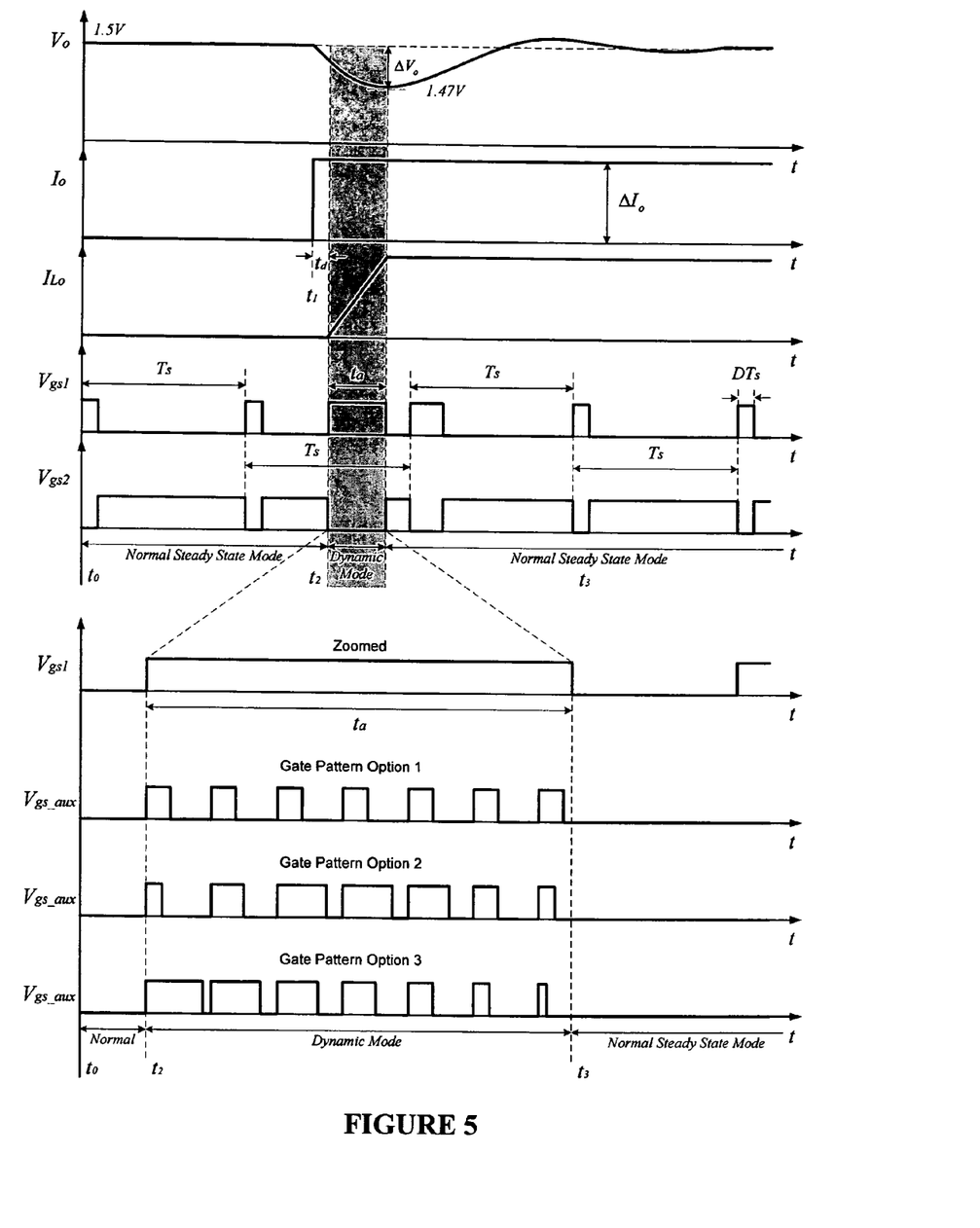
FIG. 5 is a plot of single phase VRM waveforms during the steady state and during a transient state according to the control method of the invention.

Operation of the digital controller will now be described with reference to FIGS. 4 and 5. In normal steady state operation of the power converter or when the load transient is within certain range, the pulse width of the gate signal is determined by the sensed load voltage, the nature of the power converter, and the way the system is compensated. The sampled load voltage is compared with a reference voltage in the DSP block 50 shown in FIG. 4. The discrete error signal is compensated by the compensator 52, which may be a digitally-implemented compensator such as, for example, a proportional integral derivative (PID), PI, Type II, Type III, or proportional/differential (PD) lead compensator. The compensator is selected according to the power converter requirements, based on voltage mode control. The synchronous gate signals of one phase of the converter during steady state are shown in FIG. 5 at time $t_0$-$t_2$ and $t_3$-$\infty$, Normal Steady State Mode. The frequency of the gate signal is always fixed. The pulse width or duty cycle of the gate signal is also stabilized during steady state operation. At time $t_1$ in FIG. 5, a load transient occurs. After a delay of $t_d$, at time $t_2$, the converter enters Dynamic Mode. The delay $t_d$ is due to the sampling and processing time of the digital controller. Once a load transient occurs, the duty cycle of the synchronous gate signal is adjusted, determined by how the system is compensated, and relates to factors such as the crossover frequency and the gain of the compensator. However, without the digital controller of the invention, the change in the duty cycle of the gate signal is not sufficient to handle a dramatic load change. Under such circumstances the occurrence of the next gate pulse is limited by the switching frequency of the power converter, and does not occur fast enough to transfer power to the output and minimize the output voltage drop during a load transient.

In the DSP block 50 in FIG. 4, the sampled load voltage is sent to a digital filter 54 to filter out noise and then is processed at 56 to obtain the derivative of the output voltage. The derivative of the output voltage is sent to the PWM function 57 for further processing. The algorithm for dynamic function block 58 determines when the dynamic mode will be triggered and terminated. The steady state PWM gating and the dynamic gating generated in the digital PWM block 60 are combined to form the gate signal for one phase, which will then be shifted for multiphase switching power devices. This combined signal is thus for steady state operation and dynamic operation when a transient happens.

Figure 6:
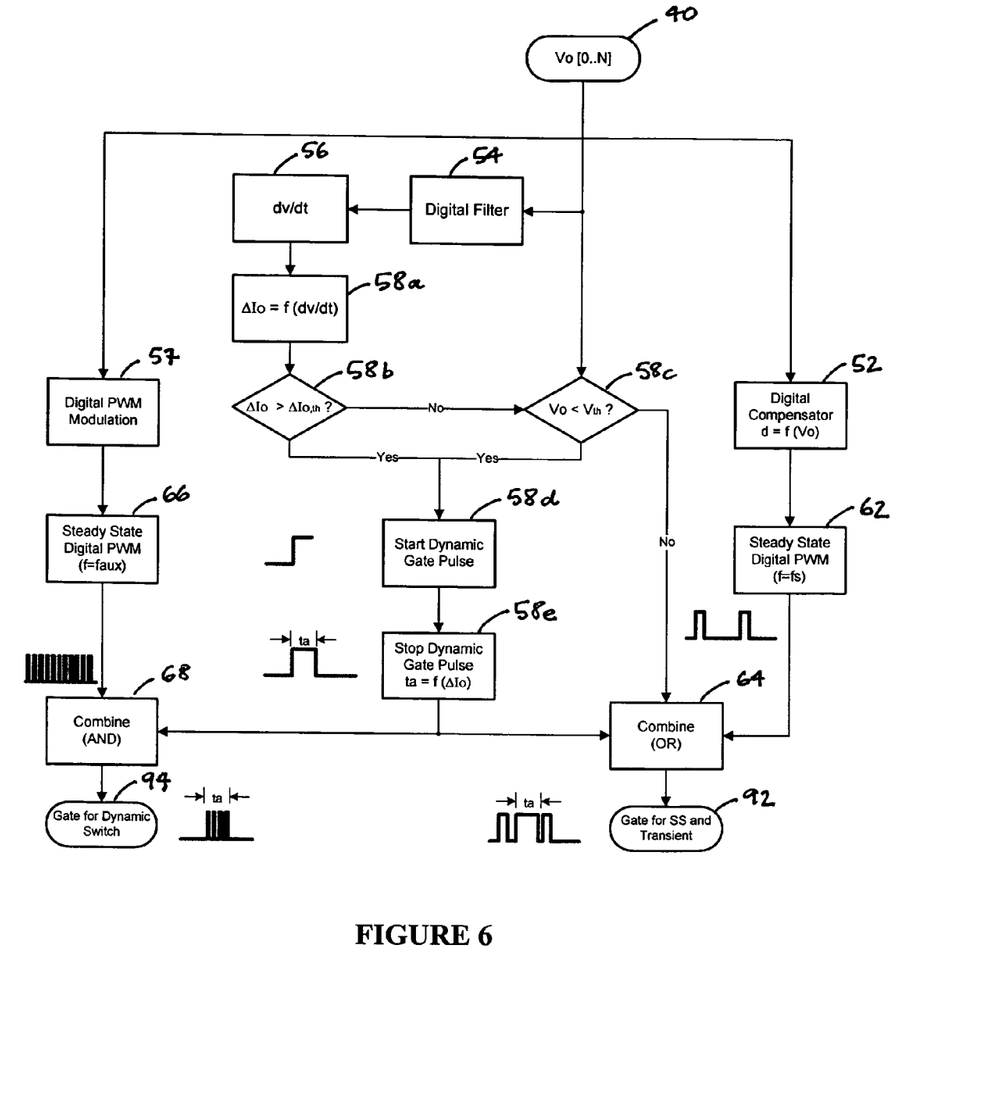
FIG. 6 is a flow chart of the control algorithm of an embodiment of a digital controller according to the invention.

The dynamic gate pattern is generated according to the process given in the flow chart shown in FIG. 6, where reference numerals corresponding to those in FIG. 4 indicate like steps. In the flow chart, the sampled voltage is filtered by a digital filter 54 to remove noise, and then is processed at 56 to obtain the derivative of the sampled voltage.

Figure 10:
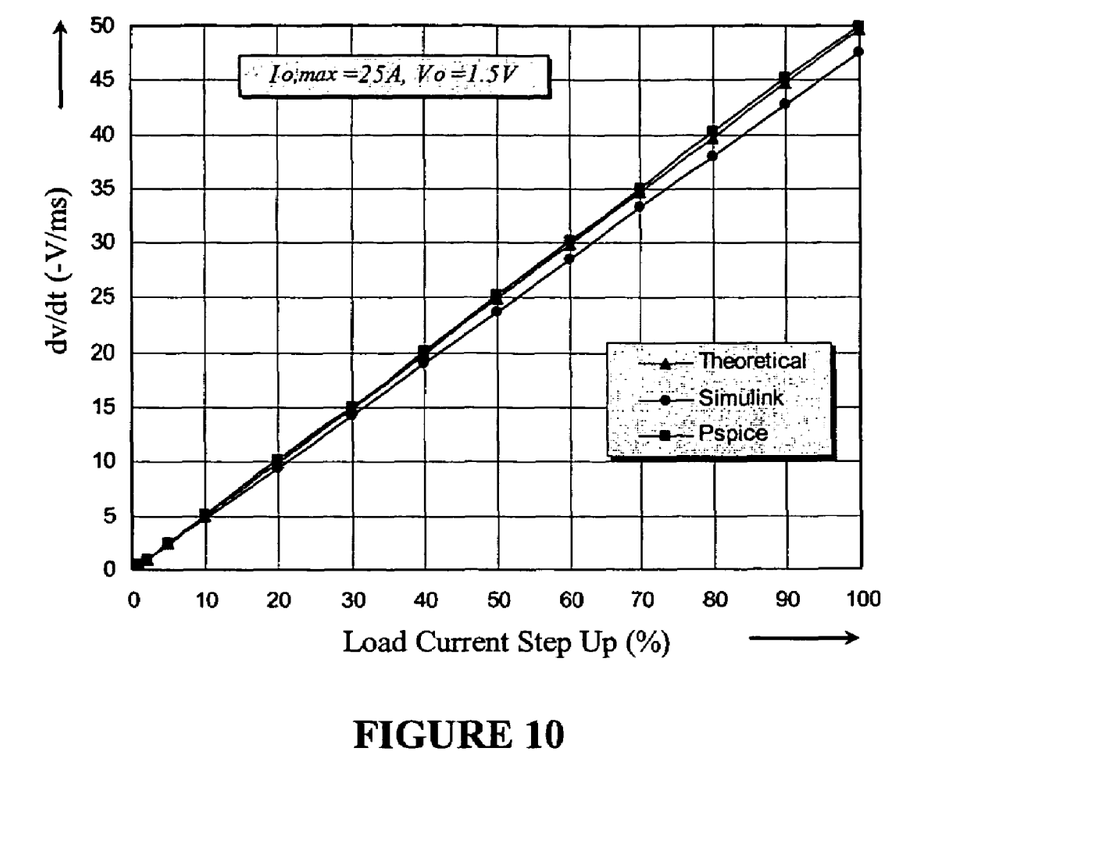
FIG. 10 is a plot of the load current change $\Delta I_o$ as a function of the output voltage slew rate dv/dt.

In one embodiment, the algorithm for dynamics 58 uses the derivative of the sampled voltage to calculate, at 58a, the change in load current $\Delta I_o$ according to a linear or non-linear function (e.g., algebraic, trigonometric, exponential) (see equation (1)). The function is based on characteristics such as the output inductance, capacitance, equivalent series resistance (ESR), switching frequency, input/output voltage, and the parameters of the compensator. For example, the voltage vs. current relationship derived from equation (1) when $f$ is a linear function is plotted in FIG. 10. This plot shows that once the derivative of the output voltage is obtained, the load step can be predicted.

$$\Delta I_o = f(dV_o/dt) \tag{1}$$

In another embodiment, rather than calculate the change in output current, the algorithm for dynamics stores data relating to possible output currents for various output voltages, and looks up the appropriate output current for any given sensed voltage. The advantages of such a look-up table approach are improved speed and the ability to implement functions which might be difficult to model mathematically (e.g., using curve-fitting approximations).

Once the derivative of the output voltage exceeds a certain value, indicating that the load current step will exceed a certain threshold value, the algorithm for dynamics 58 (FIGS. 4 and 6) will initiate a pulse for dynamic. Specifically, at steps 58b and 58c of FIG. 6, if the load current increase exceeds a threshold value, and/or the voltage drop exceeds a threshold value, the dynamic gate pulse will be started. However, if both the output voltage drop and the load current step do not exceed their given threshold values, the dynamic gate pulse will not be initiated, in which case the combined gate signal is the gate signal from the path of the steady state PWM for the main switch in the flow chart of FIG. 6.

The dynamic gate pulse remains high for a certain period of time. Theoretically, when the current through the output inductor $L_o$ reaches the value that the output current should step to (e.g., according to equation (1)), the dynamic gate pulse should be turned off. However, in accordance with the invention it is not necessary to measure the current through the inductor to determine when to turn off the dynamic gate pulse. Rather, it is only necessary to turn of the dynamic gate pulse after a period of time $t_a$ equal to that required for the output current to rise to the predicted value (e.g., according to equation (1)). The time $t_a$ is calculated by the algorithm for dynamics 58 of the DSP block 50 of the digital controller. The time $t_a$ is a function of one or more parameters of the power converter such as, for example, the output inductance, capacitance, equivalent series resistance (ESR) of the output capacitor, switching frequency, input/output voltage, and parameters of the compensator, and a function of the load current step. Equation (2) reveals the relationships to obtain the time $t_a$.

$$t_a = \frac{\Delta I_o \cdot L_o}{V_g - V_o} = \frac{f(dV_o/dt) \cdot L_o}{V_g - V_o} \quad (2)$$

As shown in FIGS. 4 and 6, the dynamic gate pulse of duration $t_a$, determined at 58e, is combined at 64 with the steady state PWM to form the gate signal of the power converter switch for both steady state and transient situations. The combination process is similar to an OR logic function. The waveform of the combined gate signals generated at 92 is shown in the flow chart in FIG. 6 and in FIG. 5. Thus, during the dynamic mode, once a load transient is detected, the switch $S_1$ in FIG. 3 will be turned on and kept on for a period of time $t_a$, calculated by the digital controller, while the switch $S_2$ will be kept off during this period of time. Thus, with the digital controller, the gate pulse starts in time, and the pulse width is not limited by the bandwidth of the closed control loop and is wide enough to supply the current from the input to the output through the filter inductor $L_o$ to help maintain the output voltage during the transient.

The optional dynamic conversion circuit may also be activated by the digital controller during the load transient. When switch $S_1$ is turned on and switch $S_2$ is turned off for a time period of $t_a$, the switch $S_{aux}$ of the dynamic conversion circuit is turned on and off by the gate signal generated at 94. It is noted that the inductor $L_{aux}$ in the dynamic conversion circuit has a substantially smaller value than that of $L_o$, such that the power transferred from the input to the output of the VRM is further accelerated. Moreover, turning $S_{aux}$ of the dynamic conversion on and off may comprise modulating (e.g., PWM) the gate of $S_{aux}$ during a load transient. A PWM modulation block for the auxiliary switch is shown in FIGS. 4 and 6, and may provide a suitable pattern of gate switching such as, for example, those shown in FIG. 5 and described below.

The first gate pattern of $S_{aux}$ (option 1 in FIG. 5) switches $S_{aux}$ at a fixed switching frequency much higher than that of the main power converter circuit. For example, the switching frequency of $S_{aux}$ may be 2 to 10 times, 2 to 100 times, or higher, than the switching frequency of the power converter, as may be possible to achieve with available technology. The pulse width of the gate signal is modulated as a constant, predetermined by the digital controller.

The second gate pattern of $S_{aux}$ (option 2 in FIG. 5) also switches $S_{aux}$ at a fixed frequency much higher than that of the main power converter circuit. The gate signal is pulse width modulated based on voltage mode control. The output voltage of the VRM is sensed and compared with the reference voltage. The error between the sensed output voltage and the reference voltage is compensated by a compensator similar to the compensator of the main power circuit, but with a larger gain. The pulse width of the gate is varied according to how the loop is compensated. For example, the loop may be compensated by a Type III compensator with a high gain.

The third gate pattern of $S_{aux}$ (option 3 in FIG. 5) also switches $S_{aux}$ at a fixed frequency much higher than that of the main power circuit. The pulse width of the gate signal is predefined to be large initially and then decreases linearly as a function of time. The decreasing rate of the duty cycle is also predefined or calculated by the digital controller.

The PWM modulated signal for the auxiliary switch $S_{aux}$ is combined with the dynamic gate pulse at 68 to form the gate signal for $S_{aux}$. The combination process is similar to an AND logic function, as shown in FIGS. 4 and 6.

Figure 7:
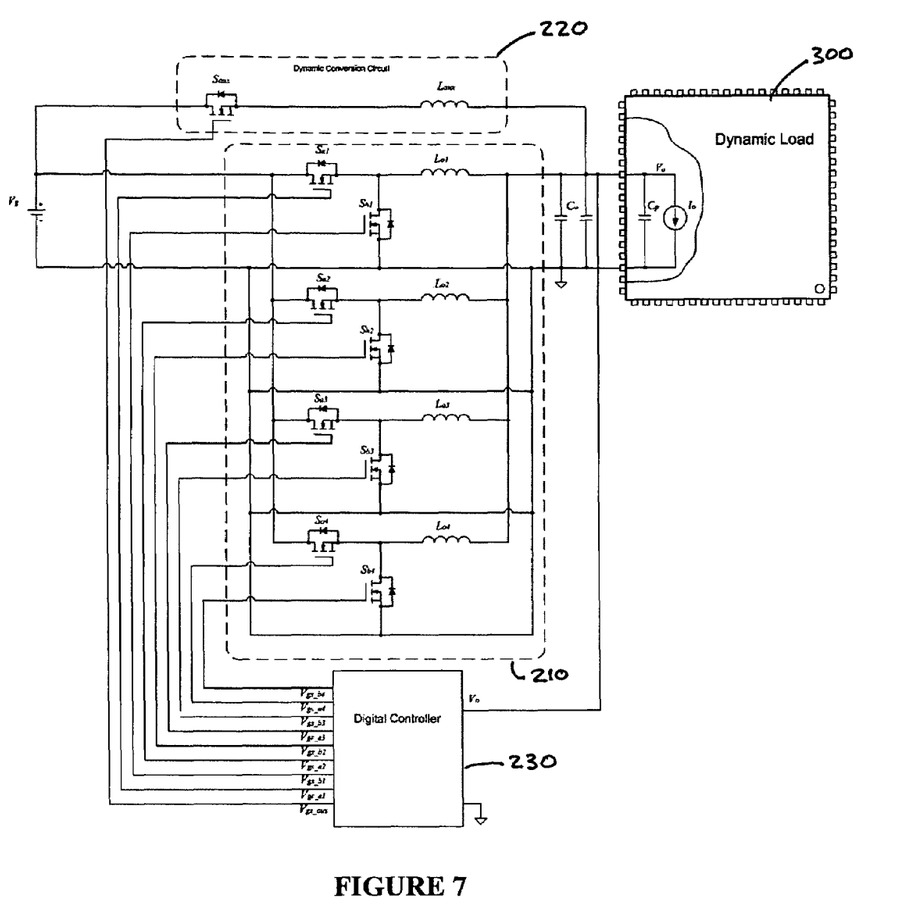
FIG. 7 is a schematic diagram of a multiphase interleaved VRM with a dynamic conversion circuit and a digital controller according to the invention.

In a second embodiment, shown in FIG. 7, the invention relates to a multiphase interleaved VRM with a dynamic conversion circuit and a digital controller. FIG. 7 shows a multiphase interleaved VRM with four power converter phases, although more or fewer phases are possible, depending on the amount of output current required. Shown in the embodiment of FIG. 7 are the main components of the interleaved VRM: the four power converter phases 210, the dynamic conversion circuit 220, and the digital controller 230. In this example, the load 300 is a microprocessor. The switches $S_{a1}$, $S_{b1}$ and the inductor $L_{o1}$ form the first phase of the multiphase interleaved power converter, each parallel phase being a synchronous buck converter. Other power converters, such as boost, buck-boost, isolated, and non-isolated could also be used. All four phases share the same output capacitor CO. The auxiliary power switch $S_{aux}$ and inductor $L_{aux}$ form the optional dynamic converter of the VRM, which is connected in parallel with the four parallel power converters.

Figure 8:
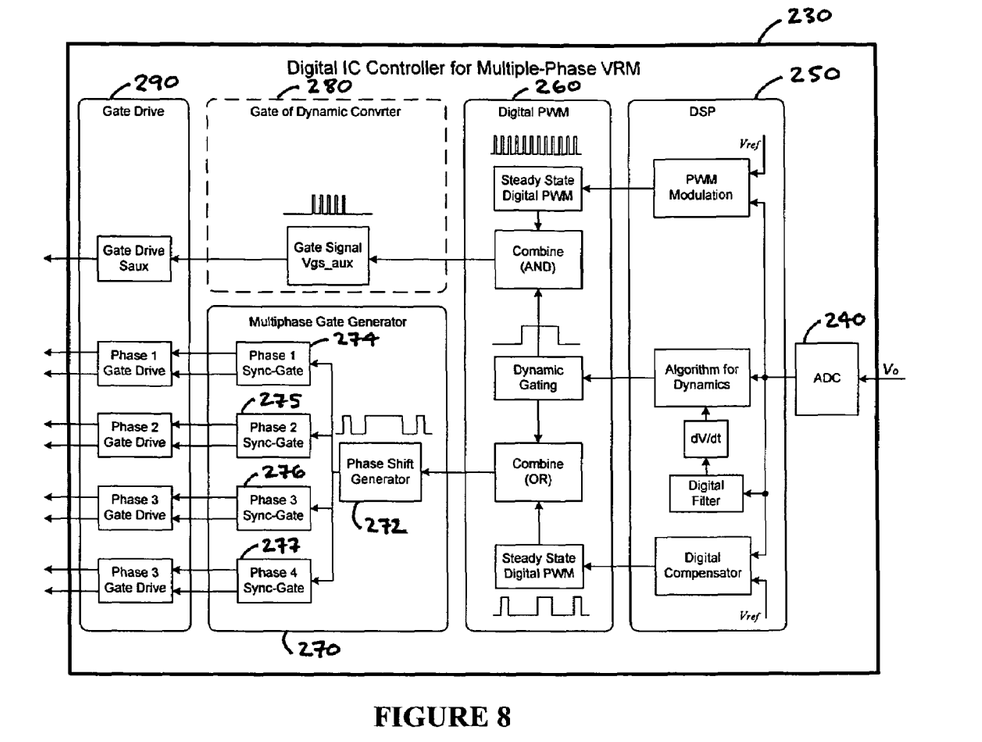
FIG. 8 is a block diagram a digital controller for a multiphase VRM embodiment.

The digital controller 230 for the interleaved VRM is shown in the block diagram of FIG. 8. The digital controller 230 has the same components and functions in the same way as the digital controller 30 in the single phase VRM described above (FIG. 4), except that the gate signal generation portion is now a multiphase gate generator 270, which generates the gate signals for paralleled buck converters. The multiphase gate generator block 270 includes a phase shift generator 272 for receiving the gate signal from the digital PWM, and four synchronous gating circuits 274 to 277, one for each of the four phases. Each synchronous gating circuit output is fed to a corresponding gate drive circuit in the gate drive block 290. The gate drive block 290 drives and sends the phase-shifted PWM gate signals to the power switches of each paralleled branch of the power converter. Optionally, it also drives and sends the gate signal to the auxiliary switch of the dynamic conversion circuit. Operation of the digital controller is substantially the same as for the single phase embodiment (see FIG. 6), in that the steady state PWM gating and the dynamic gating generated in the digital PWM block 260 are combined to form the gate signal for one phase. However, in the multiphase embodiment, this gate signal is then phase shifted by the phase shift generator 272 for multiphase switching power converters. Also, as in the single phase embodiment, the period $t_a$ at which to turn off the dynamic gate pulse may be calculated by the DSP block 250 of the digital controller. The time $t_a$ is a function of buck converter parameters such as output inductance, output capacitance, ESR of the output capacitor, switching frequency, input/output voltage, parameters of the compensator, as well as the load current step. Equation (3) describes the relationship to obtain the time $t_a$.

$$t_\alpha = \frac{\Delta I_o \cdot L_o}{4 \cdot (V_g - V_o)} = \frac{f(dV_o/dt) \cdot L_o}{4 \cdot (V_g - V_o)} \quad (3)$$

Figure 9:
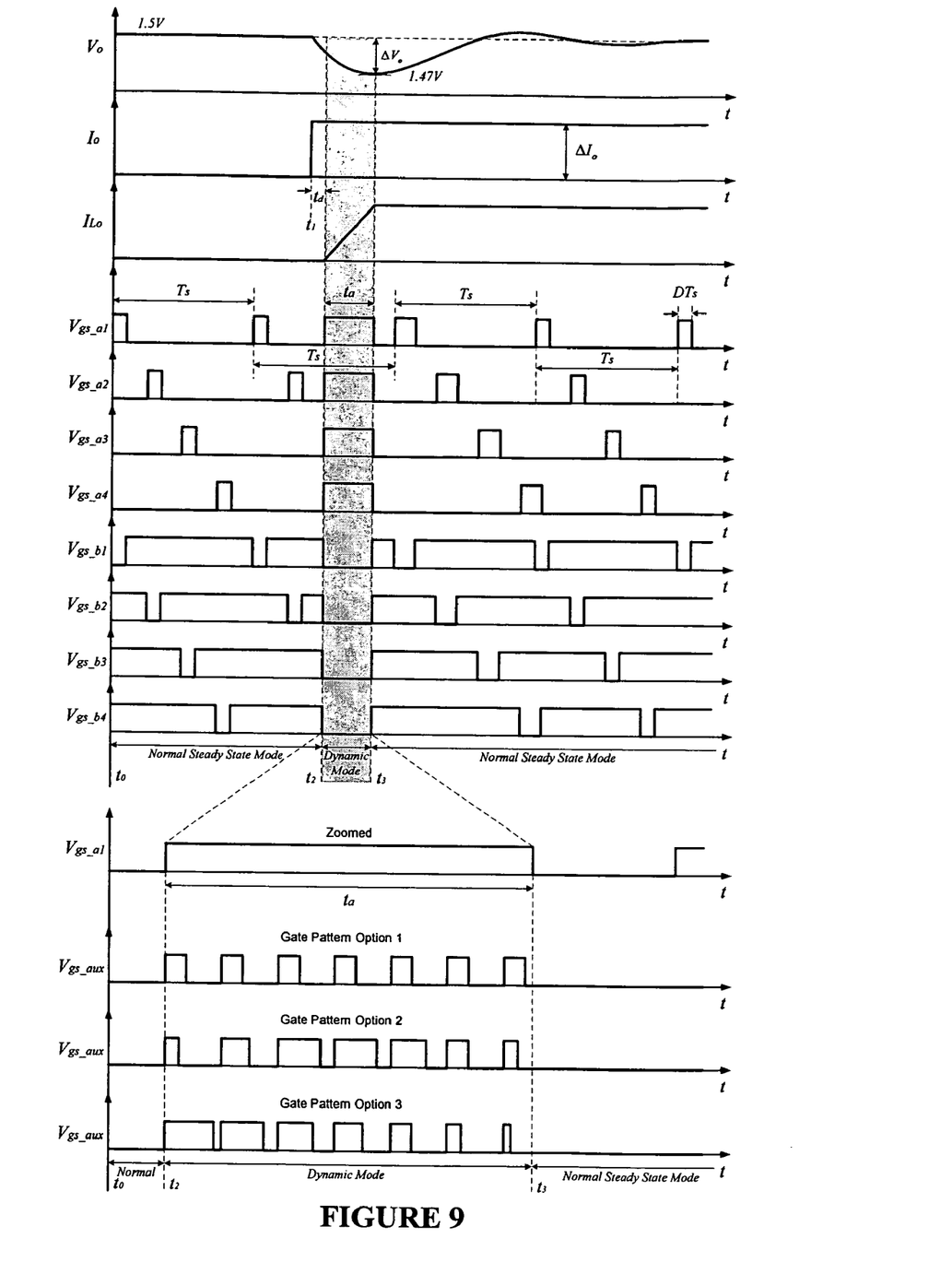
FIG. 9 is a plot of multiphase VRM waveforms during steady state and during a transient state according to the control method of the invention.

The synchronous gate signals of one phase of the converter during steady state are shown in the period referred to as Normal Steady State Mode ($t_0$-$t_2$ and $t_3$-∞) in FIG. 9. The frequency of the gate signal is always fixed. The pulse width or duty cycle of the gate signal is also stabilized during steady state operation. At time $t_1$ in FIG. 9, a step load occurs. After a delay of $t_d$, at time $t_2$, the converter enters Dynamic Mode. The delay $t_d$ is due to the sampling and processing time of the digital controller. Once a load transient occurs, the increment of the duty cycle of the synchronous gate signal is determined by how the system is compensated, and relates to factors such as the crossover frequency and the gain of the compensator.

During Dynamic Mode, the switches $S_{a1}$, $S_{a2}$, $S_{a3}$, and $S_{a4}$ are turned on and kept on for a duration of time $t_a$, as calculated by the digital controller, while the switches $S_{b1}$, $S_{b2}$, $S_{b3}$, and $S_{b4}$ are kept off during this period of time. Thus the gate pulse starts in time and the pulse width will not be limited by the bandwidth of the closed control loop and will be wide enough to supply the current from the input to the output through the filter inductors $L_{o1}$, $L_{o2}$, $L_{o3}$, and $L_{o4}$ to help maintain the output voltage during the transient.

The optional dynamic conversion circuit is also activated by the digital controller during the load transient. When switches $S_{a1}$, $S_{a2}$, $S_{a3}$, and $S_{a4}$ are turned on and switches $S_{b1}$, $S_{b2}$, $S_{b3}$, and $S_{b4}$ are turned off for a time period Of $t_a$, the switch $S_{aux}$ of the dynamic conversion circuit is turned on and off. In various embodiments the switch $S_{aux}$ may be modulated according to a desired gate signal drive pattern, three examples of which are shown in FIG. 9 as options 1 to 3. Options 1 to 3 are the same as those shown in FIG. 5 and described above with respect to the single phase VRM embodiment.

The invention is further illustrated by way of the following non-limiting example.

EXAMPLE

Figure 11:
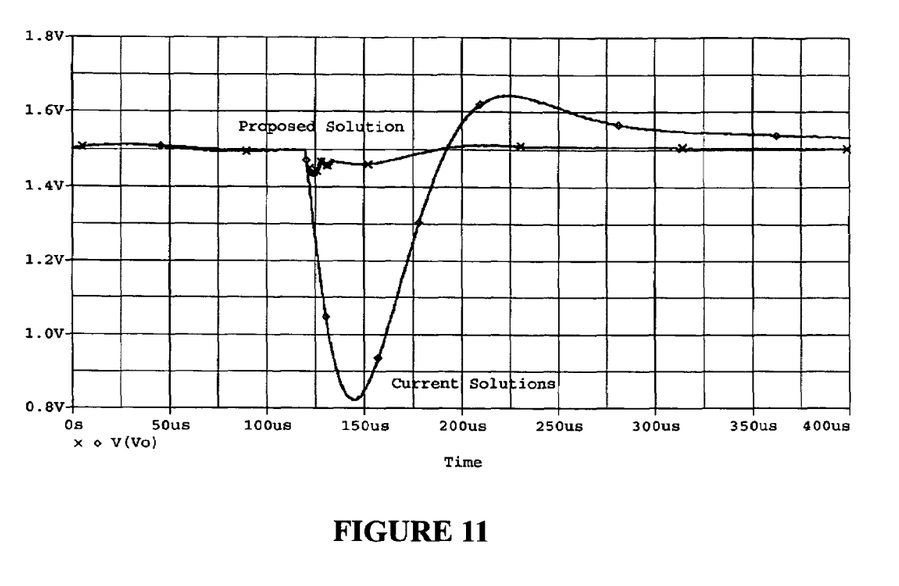
FIG. 11 is a plot showing the results of a simulation comparing the output voltage waveforms of a VRM of the invention and a conventional voltage mode controlled VRM during a load transient, in which $V_g=12$ $V_{DC}$, $V_o=1.5$ V, $I_o=25$ A, $C_o=500$ μF, $f_s=250$ kHz, and the load steps from 0.5 A to 25 A.

A voltage regulator module based on a buck converter and including a digital controller as described above and a dynamic conversion circuit was simulated in PSPICE v. 9.0 and its performance evaluated with respect to a VRM based on a typical buck converter. The input and output voltages of the two VRMs was 12 $V_{dc}$ and 1.5 $V_{dc}$ respectively, and the switching frequency of the two circuits was 250 kHz. The rated output current was 25 A and the load transient was from 0.5 A to 25 A, at a slew rate of 1000 A/μs. The results of the simulation are shown in FIG. 11, where it can be seen that the voltage drop of the VRM of the invention was less than 10% of that of the typical VRM. According to the simulation, to avoid exceeding a 70 mV output voltage drop at a 100% load current transient (25 A), an output capacitance of only 500 μF was required. In contrast, the conventional voltage mode controlled single phase VRM needed at least 5000 μF output filter capacitance. This is an approximately 6-fold reduction in output capacitance, which represents substantial savings in space on the printed circuit board, and ultimately in cost.

All cited documents are incorporated herein by reference in their entirety.

It will be understood by those skilled in the art that this description is made with reference to preferred embodiments and that it is possible to make other embodiments employing the principles of the invention which fall within its spirit and scope as defined by the appended claims.

The invention claimed is:

1. A digital controller comprising:
   a voltage sensor configured to sense an output voltage of a power supply and generate a corresponding digital signal representing the output voltage;
   a detector configured to estimate a transient load current associated with a load based on rate of change of the output voltage, the transient load current representing a change in current required by the load during a transient condition;
   a signal generator configured to generate an auxiliary switch control signal to activate an auxiliary switch to at least partially account for the transient load current when the estimate transient load current is greater than a threshold value;
   wherein the digital controller is configured to control a main high side switch as well as the auxiliary switch to maintain the output voltage; and
   wherein the digital controller produces a first control signal to control the main high side switch that, when activated, increases current supplied to the load.

2. The digital controller of claim 1, wherein the power supply is a DC-DC converter.

3. The digital controller of claim 1, wherein the power supply system is a buck converter.

4. The digital controller of claim 1, wherein the auxiliary switch control signal is a pulse train of higher frequency than a switching frequency of the main high side switch.

5. A method for controlling a voltage regulator module including a switching DC-DC converter, the method comprising:
   sensing an output voltage of the DC-DC converter and generating a corresponding digital signal representing the output voltage;
   maintaining an auxiliary high side switch in an OFF state during a steady state condition in which at least one main high side switch of the DC-DC converter produces an output current to drive a load;
   based on the output voltage, determining a rate of change associated with the output current of the DC-DC converter; and
   generating a control signal to activate the auxiliary high side switch during a transient load condition in which the rate of change associated with the output current is greater than a threshold value based on increased current consumption by the load.

6. The method of claim 5, wherein the DC-DC converter is of a non-isolated topology.

7. The method of claim 5, wherein the DC-DC converter is a buck converter.

8. The method of claim 5, further comprising pulse width modulating the control signal while the at least one main high side switch is maintained in a continuous ON state.

9. The method of claim 5, wherein each DC-DC converter is of an isolated circuit topology.

10. A method comprising:
maintaining an auxiliary high side switch of a power supply in an OFF state during a steady state condition in which at least one main high side switch in the power supply is switched to supply power to a load;
monitoring an output voltage of the power supply;
calculating a rate of change associated with the output voltage to detect a transient condition during which the load consumes additional current than when in the steady state condition; and
initiating activation of the auxiliary high side switch to an ON state to convey power from an input voltage source to the load to at least partially account for the transient condition.

11. The method as in claim 10, wherein calculating the rate of change associated with the output voltage includes producing a value representing a change in current consumed by the load during the transient condition.

12. The method as in claim 10 further comprising:
initiating activation of the at least one main high side switch by controlling multiple high side switches in respective phases of the power supply to maintain the output voltage at a substantially fixed value during the steady state condition.

13. The method as in claim 10 further comprising:
utilizing the rate of change associated with the output voltage to estimate a load current step representing an additional amount of current consumed by the load during the transient condition.

14. The method as in claim 13 further comprising:
comparing the estimated load current step to a threshold value; and
in response to detecting that the load current step is greater than the threshold value, initiating activation of the auxiliary high side switch to the ON state.

15. The method as in claim 10, wherein the at least one main high side switch includes multiple high side switches, the method further comprising:
during the steady state condition, operating the multiple high side switches of the power supply out of phase with respect to each other to maintain the output voltage; and
during the transient condition, initiating simultaneous activation of the multiple high side switches to an ON state when the auxiliary switch is activated to supply current to the load.

16. The method as in claim 10, wherein initiating activation of the auxiliary high side switch to the ON state includes:
activating the auxiliary high side switch for a respective time duration of time whose length is proportional to the rate of change associated with the output voltage.

17. The method as in claim 16, wherein initiating activation of the auxiliary high side switch to an ON state includes:
after the respective time duration:
deactivating the auxiliary high side switch; and
while the auxiliary high side switch is deactivated, repeatedly activating the at least one main high side switch in the power supply to maintain the output voltage within an acceptable voltage range.

18. The method as in claim 10, wherein the at least one main high side switch includes multiple high side switches, the method further comprising:
during the steady state condition, operating the multiple high side switches of the power supply out of phase with respect to each other to maintain the output voltage; and
during the transient condition, initiating simultaneous activation of the multiple high side switches to an ON state when the auxiliary switch is activated to supply current to the load.

19. The method as in claim 18, wherein initiating activation of the auxiliary high side switch during the transient condition includes:
pulsing the auxiliary switch ON and OFF while maintaining the multiple high side switches in a continuous ON state.

20. The method as in claim 18, wherein initiating activation of the auxiliary high side switch during the transient condition includes:
pulsing the auxiliary switch ON and OFF at a higher frequency than a rate of switching each of the multiple high side switches.

21. The method as in claim 10, wherein the auxiliary high side switch, when activated to an ON state, supplies a higher rate of current to power the load than do each of the at least one main high side switch when activated to an ON state.

22. A controller configured to:
maintain an auxiliary high side switch of a power supply in an OFF state during a steady state condition in which at least one main high side switch in the power supply is switched to supply power to a load;
monitor an output voltage of the power supply;
calculate a rate of change associated with the output voltage to detect a transient condition during which the load consumes additional current than when in the steady state condition; and
initiate activation of the auxiliary high side switch to an ON state to convey power from an input voltage source to the load to at least partially account for the transient condition.

* * * * *